United States Patent
Beckwith

(12)
(10) Patent No.: US 6,384,391 B1
(45) Date of Patent: *May 7, 2002

(54) POUCH-LIKE ARTICLE FOR MICROWAVE HEATING OF FOODS

(76) Inventor: Darla L. Beckwith, 7203 Bay Club Ct., Tampa, FL (US) 33607

( * ) Notice: Subject to any disclaimer, the term of this patent is extended or adjusted under 35 U.S.C. 154(b) by 0 days.

This patent is subject to a terminal disclaimer.

(21) Appl. No.: 09/624,405

(22) Filed: Jul. 24, 2000

Related U.S. Application Data

(63) Continuation-in-part of application No. 09/364,909, filed on Jul. 28, 1999, now Pat. No. 6,093,920.
(60) Provisional application No. 60/128,024, filed on Apr. 6, 1999.

(51) Int. Cl.[7] .................................................. H05B 6/80
(52) U.S. Cl. ................. 219/734; 219/725; 99/DIG. 14; 426/234
(58) Field of Search .................... 219/734, 725, 219/727, 732, 762; 99/DIG. 14; 426/234, 107, 243; 383/127, 109, 116; 428/34.3, 34.2

(56) References Cited

U.S. PATENT DOCUMENTS

| | | | | |
|---|---|---|---|---|
| 4,989,748 A | * | 2/1991 | Parr, Jr. et al. | 220/367 |
| 5,003,142 A | * | 3/1991 | Fuller | 219/725 |
| 5,023,134 A | * | 6/1991 | Bezigian et al. | 428/336 |
| 5,567,455 A | * | 10/1996 | Alsbrook, Sr. | 426/115 |
| 5,863,578 A | * | 1/1999 | Guarino | 426/234 |
| 6,093,920 A | * | 7/2000 | Beckwith | 219/734 |

* cited by examiner

Primary Examiner—Philip H. Leung
(74) Attorney, Agent, or Firm—M. K. Silverman

(57) ABSTRACT

A method of microwave cooking, heating and re-heating includes the steps of placing food to be cooked, heated or re-heated into a microwave compatible container having an open mouth thereof and, thereafter, applying over said mouth of said microwave compatible container an FDA grade waxpaper having a basis weight in a range of about 18/28 to about 21/33. Thereafter, the container is placed in a microwave oven for less than a prescribed period of heating for such food type and quantity. Alternatively, such FDA grade waxpaper may be tightly wrapped about food to be heated and thereafter placed within a microwave oven, thereby dispensing with the use of any microwave compatible container.

9 Claims, 3 Drawing Sheets

POUCH-LIKE ARTICLE FOR MICROWAVE HEATING OF FOODS

REFERENCE TO RELATED APPLICATION

This is a continuation-in-part of application Ser. No. 09/364,909, filed Jul. 28, 1999 U.S. Pat. No. 6,093,920, which claims benefit of Provisional No. 60/128,024 filed Apr. 6, 1999, entitled Method of Microwave Heating of Food.

BACKGROUND OF THE INVENTION

The present invention relates to the use of special purpose waxpaper in microwave heating and cooking.

A longstanding problem in the area of microwave heating of foods has been that, unless the food or comestible to be microwaved is positioned within a wholly enclosed container, that is, one which typically includes a cover that may include small perforations, the food cannot, as a practical matter, be heated or microwaved, this due to the fact that foods when heated within a microwave oven will, in large part, splatter out of the microwavable container and against the walls of the microwave oven so that as much of half of a given quantity of food within the microwave container will, in the absence of a suitable cover, be thrown up against the interior surfaces of the microwave oven. This phenomenon, it is believed, is due primarily to the rapid expansion of moisture within the food to be microwaved so that, during microwaving and, particularly, microwaving at high power, an evaporation of water will occur at such a rate that such splattering will result.

Alternatively, prior art usage has included the use of paper toweling and plastic wrap to cover food, or no use of a covering. Where paper toweling is used, it will often stick to the food and draw the moisture out of the food, while plastic wrap will partially melt thereon and, as well, may be toxic.

The traditional response to the above problem has been to provide each microwave container with a cap or cover which, typically (but not always), will include perforations to permit escape of expanding moisture. Where perforations are not provided, a tight substantially moisture-proof cover is provided to the microwavable container to produce a "pressure cooker" effect during the microwaving process.

Quite recently, the Reynolds Aluminum Company began marketing a waxpaper purportedly suitable for use in microwave applications, that is, as a covering or enclosure for use in a microwave environment. However, testing by the within inventor of the Reynolds waxpaper has indicated that the Reynolds material is very light in weight and, typically, will blow or pull off of the microwave container soon after initiation of a microwave sequence, or will otherwise separate from the container permitting escape of steam. Accordingly, it is difficult to maintain contact between microwave waxpaper of the Reynolds type and the open mouth of the microwave container within which food has been placed. Alternatively, and in those instances where the Reynolds waxpaper does not blow off of the food container, it has been found to draw moisture thereinto causing the disintegration thereof. It is believed that, among other reasons, the Reynolds microwave waxpaper does not perform in a desirable way because such paper is too light such that, by its physical characteristics, it will absorb evaporated moisture from the food to be heated thereby causing a rapid drop in the integrity of the Reynolds waxpaper. In view of the above, the Reynolds waxpaper product is of little value in any microwave heating applications.

In the terminology of the paper industry, dry waxpaper is formed by a process in which wax is applied to a bleached parchment type paper such that most of the wax is driven into the paper, leaving little wax upon the surface thereof. Since the surface of such dry waxpaper is left substantially uncoated by wax, the porosity thereof remains significant relative to the porosity of so-called wet waxpaper which is formed by a process in which wax (typically paraffinic wax) is applied upon the surface of each sheet thereby covering or sealing the fibers thereof. In addition, the wax of dry waxpaper will not melt as readily, given the fact that the wax is substantially embedded within the fiber structure of the paper.

The present inventor has thereby discovered that the use of a cover to a microwavable container is not necessary to solve the problem of splattering and, more particularly, has discovered that certain waxpapers can serve as a convenient substitute to a cover to a microwavable container, particularly when the food to be heated is in a container of a size not having an available cover therefore. Also, it has been discovered that such use of special purpose waxpaper can bring about a superheating or steaming of microwaved food thereby accelerating the cooking or re-heating thereof. The invention thereby meets a long felt need in the art for a more practical means of covering and heating foods in microwave applications.

SUMMARY OF THE INVENTION

The instant invention constitutes an article for microwave cooking, steaming, heating and re-heating of food in which food to be cooked, heated or re-heated is placed into an open mouth of a bag, pouch, or envelope comprising an FDA grade waxpaper having a basis weight in a range of about 15/28 to about 26/39. Thereafter, the bag is placed within a microwave oven for a period of time less than the normally prescribed period for the heating of such food type and quantity. During such period, moisture will be driven from the food and vaporized, thereby causing a steam heating and cooking effect of the food within the article. Accordingly, the article relates to a new use of waxpaper in which as an alternate to the above, the outline bag may be placed over the mouth of a microwavable container filled with food to be microwave-heated. As a second step, the waxpaper pouch is pressed pressing onto the peripheral edges defining the mouth of the microwavable food container. Thereafter, the combination of said container pouch and said sheet of microwave paper, with food to be microwaved positioned thereunder, is placed within the microwave oven. Upon activation of the microwave, a combination of the physical properties of said waxpaper and the microwave frequencies imparted to the food to be heated, produce a relative vacuum and superheating steam effect within the region above said food and below said waxpaper article to form an effective food-tight seal along the peripheral interface between said food container and said sheet of waxpaper.

It is therefore an object of the present invention to provide an efficient article for microwave steaming cooking and re-heating which is more convenient than such methods known in the art and, and which, as well, will enhance the flavor of stale foods by adding moisture thereto. Meats such as chicken, hamburgers and hot dogs are cooked evenly without drying out or becoming rubbery.

It is another object to provide a new use of certain waxpaper which, in combination with microwave frequency radiation, will create a vacuum effect internal to a chamber created by the combination of said waxpaper and a microwave container to which said sheet of waxpaper has been adhered, thereby enabling retention of vitamins, minerals, and moisture within the microwave container.

It is a further object of the invention to provide a simple and convenient article for microwave heating which eliminates the need for a microwave container cover complemental with and snap fittable onto a microwave heating dish or structure.

It is a yet further object to provide an article of the above type in which the means used as a microwave cover minimizes splatter, reduces clean-up, and is disposable.

It is a still further object to provide a non-stick medium for enclosure of microwave dishes.

The above and yet other objects and advantages of the present invention will become apparent for the hereinafter set forth Brief Description of the Drawings and Detailed Description of the Invention as set forth herein.

BRIEF DESCRIPTION OF THE DRAWINGS

FIG. 4 is a schematic view showing the use of the inventive article as a covering of the mouth of a food-containing microwavable container, showing the heating of rice, peas or the like.

DETAILED DESCRIPTION OF THE INVENTION

The present invention relates to the use of FDA approved so-called wet waxpaper and, more particularly, to so-called 15/25 to 30/40 wet waxpaper of the type sold by McNairn Packaging, Westfield, Mass. (also known as H699 9X9 26/39 BL KR HI GL).

The FDA specifications for this type of waxpapers are set forth in 21 CFR 172.886 and 178.3710. Such waxpaper typically is formed of a suspension of approximately ten percent wood fibers within ninety percent water in which most of said water is absorbed by the wood fibers during a curing process. Waxpaper, in accordance with the provisions of said regulation, means petroleum coated paper that may be safely used in non-food articles in contact with food in accordance with conditions and parameters set forth in said regulations. As noted therein, petroleum wax will typically comprise a mixture of solid hydrocarbons, paraffinic in nature, which are derived from a petroleum base. The difference in definition between so-called wet and dry waxpaper is discussed in the Background of the Invention above. Such food grade FDA-approved waxpaper is also defined in terms of its basis weight which is the weight in pounds of a ream (500 sheets) of such paper when cut to a standardized size of 24×36 inches. A base weight of paper, of the type used herein is described in terms of weight both before and after the waxing thereof has occurred. As such, the unwaxed basis weight of suitable waxpaper is typically in a range of fifteen to thirty pounds and in a range of twenty-five to forty pounds after waxation. Further, the melting point of such waxpaper, particularly wet waxpaper, is in a range of 130 to 165 degrees Fahrenheit with a mean of about 144 degrees Fahrenheit. It is, accordingly, to be understood that an integral parameter of such waxpaper for purposes of the present invention is the relatively low melting point thereof, that is, a melting point which is quickly attained at the surface of a microwavable container and, soon thereafter, by the food so microwaved (where a container is not utilized). The viscosity of the wax of such waxpaper, after melting, is 40.5.

Historically, waxpaper of such type has had no commercial application other than that of separating refrigerated or frozen slabs of meat and fish to separate such layers for purposes of shipment, freezing, or carrying by a retail customer (to be followed by placement into a freezer). It is, accordingly, to be appreciated that paper of the H699 or McNairn 26/39 type has known no use in any area other than pan liners in bakeries and in the butcher or refrigerated meat business, that is, as a frozen meat interlever, the cold food wrap, slip sheet therefore, tray liner in a freezing compartment of a refrigerator, a moisture barrier in such applications, and in other frozen or cold food related interleaving applications. Further, such waxpaper has historically been available only in sheets and rolls.

Figure 1:
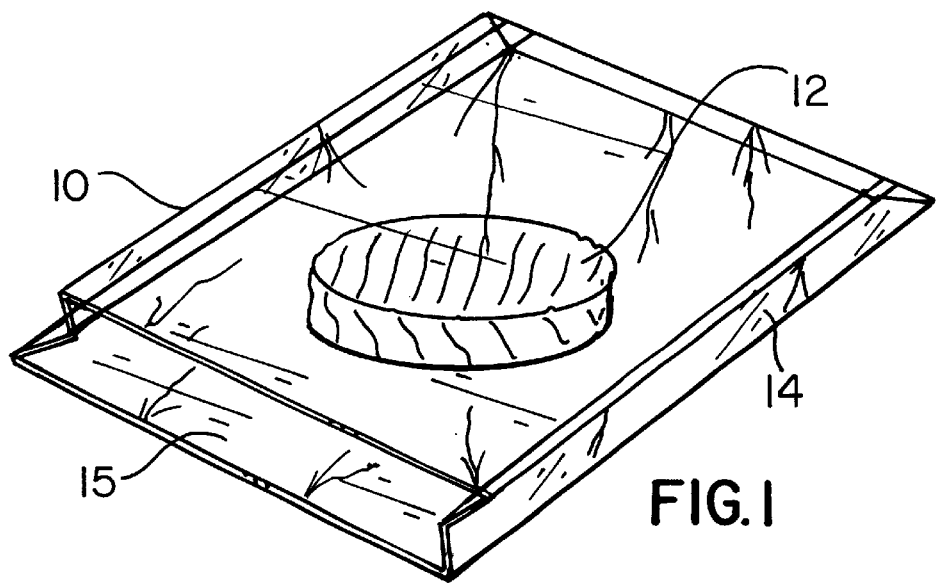
FIG. 1 is a perspective view of the inventive article showing a hamburger patty therein.
Figure 2:
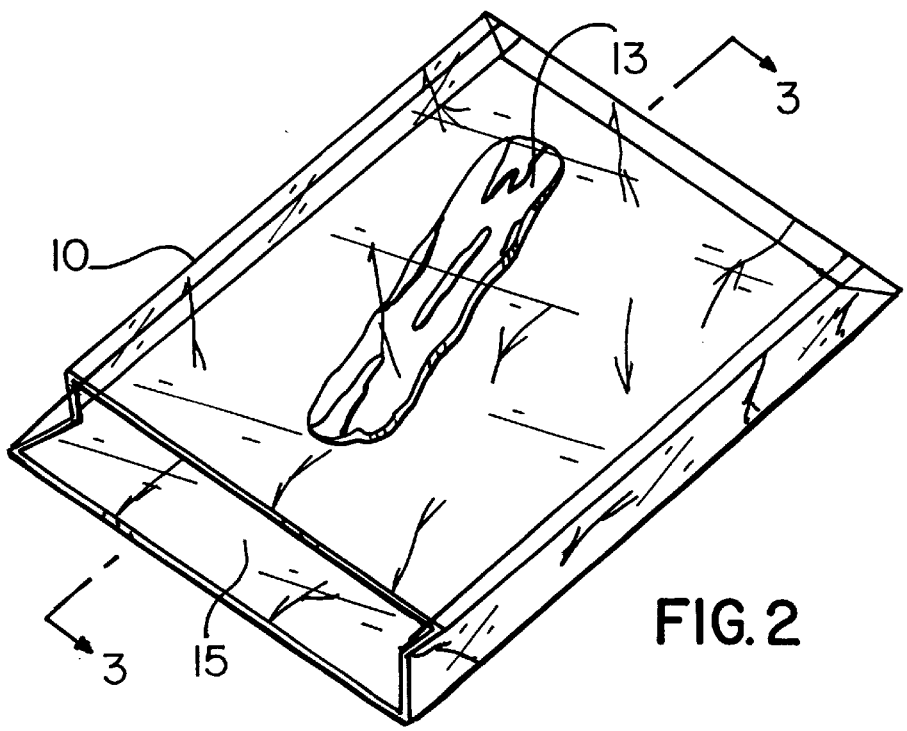
FIG. 2 is a view similar to that of FIG. 1 showing a strip of bacon therein.
Figure 3:
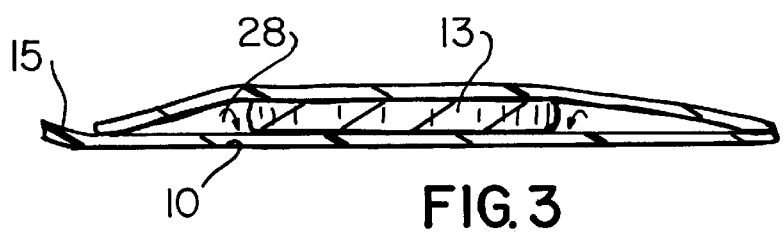
FIG. 3 is a cross-sectional view taken along Line 3—3 of FIG. 2.

Show in FIGS. 1 to 3 is a bag, pouch or envelope 10 comprising said FDA grade paper, which is employed to envelop food to be microwaved such as a hamburger 12 or bacon 13. Each pouch 10 includes side walls 14 and a closable mouth 15. Shown in the cross-sectional view of FIG. 3 is a lower base 17 of the pouch 10 as well as a supermoisture effect 28, further described below.

Figure 4:
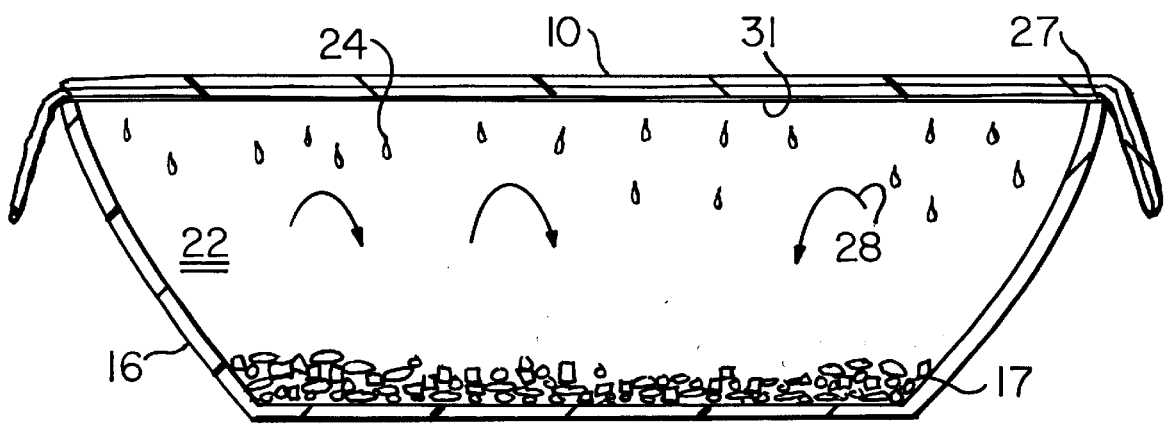
Figure 6:
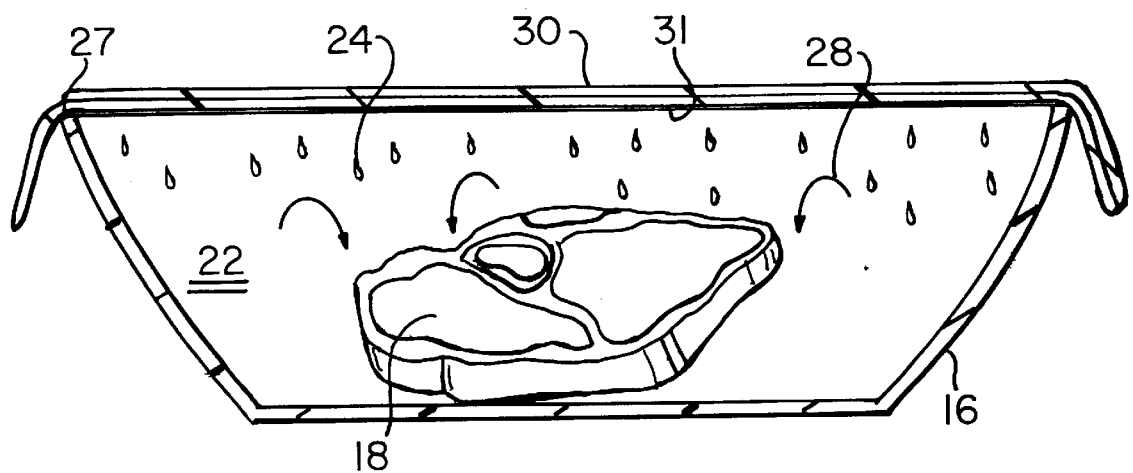
FIG. 6 is a schematic view, similar to that of FIG. 4, showing use of the present article to cook a steak and further showing the steaming effect internal to waxpaper after microwaving has initiated.

In the views of FIGS. 4 and 6 are shown waxpaper pouch 10 after it has been placed over a microwavable container 16 and food (rice 15 or steak 18) contained therein. It is, thereby, to be appreciated that pouch 10 may be placed over the microwavable container 16 prior to its insertion into microwave oven.

There is also shown the effect of microwave radiation upon the food 15 or 18 and, therein, a vacuum effect which is created within a region 22 and, as well, an accumulation of moisture 24 upon an inner surface 31 of pouch 10 during the microwave process.

Figure 5:
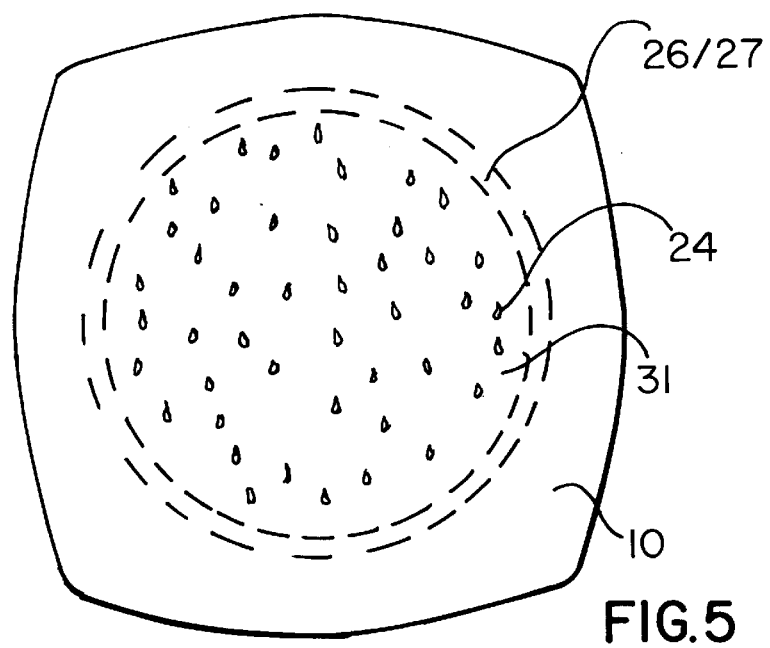
FIG. 5 is a bottom view of the inventive pouch during the microwaving shown in FIG. 4.

Shown in the view of FIG. 5 is the manner of accumulation of moisture 24 upon the inner surface 31 of pouch 10 and, as well, an annular region 26 or interface between a mouth-defining peripheral edge or mouth 27 of the microwavable container 16. Accordingly, at the interface between annular region 26 and mouth 27 of the microwavable container 16 occurs a seal which is a function both of a vacuum effect generated within region 22 and of the weight of accumulated moisture 24 upon the pouch 10. Accordingly, through the combined effect of the weight of moisture 24 and the vacuum effect within region 22, a substantial fluid-tight seal is defined at annular region 26. It is noted that even if such a seal does not fully form, the microwave energy within the oven will release moisture which will evaporate within region 22 to become steam 28.

It is to be further appreciated that, as a result of the combined effect of said sealed annular region, created by melting of wax of said waxpaper 14 at the interface with the mouth 27 of container 16 and the weight of accumulated moisture 24, the waxpaper sheet 14 is secured to container 16 with sufficient pressure so as to enable superheated moisture effect (see FIG. 3) within container 16 to impart a superheating, that is, pressure cooker effect to the food 18 to be heated. As a result thereof, the food is cooked or re-heated within a period substantially less, typically less than half, of the normally prescribed period for a microwave heating. In addition, the steam effect 28 operates to impart moisture into food 18 far in excess of moisture which would typically result in the microwaving process. Rather, the process typical in microwaving, that of evaporation of moisture from the food, is effectively reversed through the instant method.

Through the above set forth method described for the implementation thereof, the within inventor has discovered that waxpaper and, preferably, paraffin treated waxpaper, possesses a molecular structure which is not affected by the frequency of the microwave oven and, additionally, possesses appropriate surface properties to attract and hold moisture 24 in the manner above described with reference to FIGS. 4 to 6. That is, waxpaper has been found to be a substantial thermal insulator such that it will not incur any significant temperature during the microwaving process. It thereby can be readily held by a user of the present system without burning of the fingers. Therein, during the microwaving process, wax will melt primarily along annular region 26, so that removal of the waxpaper 24 after microwaving, will not be impeded and, further, so that no problem or concern need exist relative to potential contamination of the food 18 by waxpaper 14 after microwaving has occurred. One result of the above is cooking which is odorless and non-toxic.

Summarizing the invention, it is to be appreciated that the particular weight of the employed wet waxpaper, as above defined, taken in combination with the weight of moisture 24 which accumulates within the microwave container 16 during the heating process, creates pressure, along annular region 26 sufficient to overcome the pressure associated with the release of moisture from the microwave food thereby creating, within internal region 22 (see FIG. 4), a high moisture, high negative pressure environment within the sealed area. The phenomenon is therefore made possible through a combination of the weight of paper and the melting point of the wax which is embedded both upon and within the substrate of the waxpaper.

Accordingly, while there has been shown and described the preferred embodiment of the instant invention it is to be appreciated that the invention may be embodied otherwise than is herein specifically shown and described and that, within said embodiment, certain changes may be made in the form and arrangement of the part without departing from the underlying ideas or principles of this invention as set forth in the herewith.

Having thus describe my invention what I claim as new, useful and non-obviousness and, accordingly, secure by Letters Patent of the United States is:

1. An article for microwave cooking, steaming, heating and re-heating of food, comprising a pouch or envelope comprising an FDA grade waxpaper having a basis of dry to wet weight in a range of about 15/28 to about 26/39, said pouch or envelope having a mouth proportioned for insertion therein of food to be microwaved.

2. The article as recited in claim 1 in which said waxpaper comprises a wet waxpaper having a melting point of between about 130 degrees Fahrenheit and 165 degrees Fahrenheit.

3. The article as recited in claim 2 in which said waxpaper exhibits a basis weight after waxation in a range of about 26 to about 39 pounds per ream of 9×9 inch paper sheets.

4. The article as recited in claim 3 in which a coating used in said wet waxpaper comprises a paraffinic petroleum.

5. A method of microwave cooking, steaming, heating and re-heating of food comprising:

(a) placing food to be cooked, steamed heated or re-heated within a pouch formed of a FDA grade waxpaper having a basis of dry to wet weight in a range of about 15/25 to about 30/40;

(b) sealing a mouth of said pouch; and (c) placing said pouch in a microwave oven for less than an otherwise prescribed period of microwaving of such food type and quantity.

6. The method as recited in claim 5 in which said waxpaper of said pouch comprises a wet waxpaper having a melting point of between about 130 degrees Fahrenheit and 165 degrees Fahrenheit.

7. The method as recited in claim 6 in which said waxpaper exhibits a basis weight after waxation in a range of about 26 to about 39 pounds per ream of 9×9 inch paper sheets.

8. The method as recited in claim 6 in which a coating used in said wet waxpaper comprises a paraffinic petroleum.

9. The method as recited in claim 5 in which said waxpaper exhibits a basis weight after waxation in a range of about 26 to about 39 pounds per ream of 9×9 inch paper sheets.

\* \* \* \* \*